United States Patent [19]

Kunert

[11] Patent Number: 5,391,416
[45] Date of Patent: Feb. 21, 1995

[54] GLASS PANE ASSEMBLY

[75] Inventor: Heinz Kunert, Cologne, Germany

[73] Assignee: St. Gobain Vitrage International, Courbevoie, France

[21] Appl. No.: 819,414

[22] Filed: Jan. 10, 1992

[30] Foreign Application Priority Data

Jan. 11, 1991 [DE] Germany ............... 4100631

[51] Int. Cl.$^6$ .............................................. B60R 13/06
[52] U.S. Cl. ............................... 428/122; 49/495.1; 52/204.595; 428/358
[58] Field of Search ................. 428/122, 358; 52/403, 52/399; 49/493, 495, 493.1, 495.1

[56] References Cited

U.S. PATENT DOCUMENTS

| | | | |
|---|---|---|---|
| 2,739,358 | 3/1956 | Kunkel | 49/495 X |
| 3,779,794 | 12/1973 | De Santis | 428/422.8 |
| 4,032,489 | 6/1977 | Haverstreng | 524/505 |
| 4,139,234 | 2/1979 | Morgan | 296/201 |
| 4,433,010 | 2/1984 | Pedain et al. | 427/160 |
| 4,571,278 | 2/1986 | Kunert | 156/108 |
| 4,606,159 | 8/1986 | Kunert | 52/208 |
| 4,678,696 | 7/1987 | Maeno et al. | 49/495 X |
| 4,933,032 | 6/1990 | Kunert | 156/108 |
| 4,938,521 | 7/1990 | Kunert | 156/108 X |
| 4,986,867 | 1/1991 | Braendle et al. | 156/244.11 |

FOREIGN PATENT DOCUMENTS

| | | |
|---|---|---|
| 1234660 | 4/1988 | Canada . |
| 0024501 | 3/1981 | European Pat. Off. . |
| 0076924 | 4/1983 | European Pat. Off. . |
| 3602198 | 4/1987 | Germany . |
| 2175634 | 12/1986 | United Kingdom . |

*Primary Examiner*—Henry F. Epstein
*Attorney, Agent, or Firm*—Pennie & Edmonds

[57] ABSTRACT

An automobile glass pane prepared for adhesive bonding to the fastening flange of a window frame comprises a profiled spacer having a web aligned approximately perpendicular to the glass pane. Adjacent the web is a bead of a plastic adhesive having a high adhesion with respect to the spacer and with respect to the fastening flange. The bead of plastic adhesive, moreover, is of relatively high shear strength and is arranged on the side directed towards the border of the pane. Arranged on the other side of the web is a bead of a reaction adhesive composition. This web has a height corresponding to the minimum distance of the glass pane from the fastening flange. The bead of plastic adhesive serves to fix the glass pane in its installed position during the hardening phase of the reaction adhesive composition.

29 Claims, 3 Drawing Sheets

GLASS PANE ASSEMBLY

FIELD OF THE INVENTION

This invention generally relates to an automobile glass pane assembly which may be adhesively bonded to the window frame of an automobile body. The glass pane assembly includes a profiled spacer of a cured polymer.

BACKGROUND OF THE INVENTION

To simplify the fitting of automobile glass panes, it is known in the prior art to provide the glass pane with a profiled spacer embracing the border thereof, or firmly adhering to the side facing a fastening flange of the window frame. Profiled spacers embracing the border of the glass pane are generally composed of a thermoplastic polymer, such as PVC, or of a thermoset plastic, such as a polyurethane. Typically, these spacers are produced by injection-molding processes wherein the glass pane is placed in an injection-mold and the spacer is injection molded adhesively onto its border. Automobile glass panes of this type are described, for example, in European patent publication EP 0,076,924, U.S. Pat. No. 4,139,234 and Canadian patent No. 1,234,660.

Spacers adhering to one side on the border of the glass pane are composed generally of polyurethane reaction systems. Typically, these profiled spacers are formed on the glass pane as an extrusion die traverses along its border. Such glass panes are disclosed, for example, in U.S. Pat. Nos. 4,571,278, 4,938,521 and 4,933,032.

If automobile glass panes are fastened in the window frame of the body by means of a bead of adhesive, it is generally not only necessary to position the glass pane carefully within the window opening, but also to hold mechanically the pane at least until the bead of adhesive has hardened to such an extent that it no longer deforms under the weight of the pane. In addition to the positioning of the glass pane in the plane of the window opening, an individual positioning of the glass pane in the direction perpendicular to the surface area of the window opening is also necessary. This is because bent glass panes generally have bending tolerances in the border region which have to be compensated by the corresponding adaptation of the installation depth, such as in the case of a flush-border installation.

In order to fix the glass pane during the hardening phase of the fitting adhesive within the window opening, it is also known, for example, to bond individual fastening straps of plastically deformable metal adhesively to the glass pane along its border region. These straps are bent around the fastening flange of the window frame once the glass pane has been positioned. See, for example, U.S. Pat. No. 4,606,159. This known method requires additional manual work in order to bend the individual fastening straps.

SUMMARY OF THE INVENTION

The object of the invention is to provide an automobile glass pane assembly having a profiled spacer along the border of a glass pane which, without additional mechanical fixing aids, does not substantially change its position during the hardening phase of the fitting adhesive after its adjustment in the window opening. In this manner, the installation operation as a whole can be simplified and shortened.

According to the invention, this object is achieved by providing a glass pane with a profiled spacer firmly bonded to one surface of the pane proximate to a peripheral edge thereof for supporting the weight of the pane in a fastening flange of a window frame oriented substantially parallel to one edge of the pane. The spacer has at least one web aligned essentially perpendicular to the glass pane and extending toward the flange. Next to the web, arranged parallel thereto, is a bead of a reaction adhesive composition extending beyond the web. On the other side of the web, arranged in contact therewith, is a bead of a plastic adhesive composition which bears the dead weight of the glass pane during the hardening time of the reaction adhesive in the installed position of the pane The term "plastic" as used herein, is meant to define a material which is deformable under the application of pressure thereto and which when the pressure is released, does not recover its original shape or configuration.

Advantageously, the inventive automobile glass pane assembly can be fixed in the installed position without the need of additional mechanical fixtures and, in a particularly expedient way and, moreover, can be realized with tried-and-tested adhesive compositions. The web, however, determines the minimum distance from the fastening flange in addition to separating or delimiting the two different strands or beads of adhesive from each other. In addition, the present invention considerably facilitates the depositing of the two strands of adhesive. Particularly, the web serves as a guide strip when depositing the pre-formed strands of adhesive, or as a guide strip for the extrusion dies used to form the strands of adhesive.

The glass plane is fixed in its installed position by the strand of plastic adhesive composition until the reaction adhesive takes over this function. In order to perform this function, the strand of plastic adhesive on the one hand, has a high adhesion both with respect to the glass pane and the spacer on the glass pane, and with respect to the fastening flange of the window frame. On the other hand, the strand of plastic adhesive must also have a viscosity such that although this bead of adhesive deforms plastically during fitting and positioning of the glass pane, it withstands the stress induced by the dead weight of the glass pane. In contrast to other fixing methods, the forces induced by the dead weight of the glass pane are advantageously distributed over the entire strand of the plastic adhesive, the length of which corresponds to the length of the overall periphery of the pane. The specific shearing forces in the bead of the plastic adhesive, moreover, are relatively small so that these conditions can be met by tried-and-tested adhesive compositions.

The web of hardened polymer which is aligned perpendicular to the glass pane also contributes considerably to the fixing of the glass pane during the hardening phase of the reaction adhesive. Since the web is in direct contact with the bead of plastic adhesive, the web supports and thereby counteracts the deformation of the bead of plastic adhesive, at least for the hardening time of the reaction adhesive.

Further, according to the invention, the bead of permanently plastic adhesive composition is arranged on the outer side directly adjoining the web, i.e., directed towards the border of the pane of the web aligned perpendicular to the glass pane.

Apart from the function of fixing the glass pane, the bead of plastic adhesive composition may additionally assume sealing functions. This may be particularly advantageous, for example, whenever the automobile glass pane comprises laminated glass wherein the intermediate layer of the laminated glass pane is to be protected against moisture penetrating from outside.

In another embodiment of the invention, the profiled spacer has two adjacent channels for the two different beads of adhesive. Further, the web determines the distance from the fastening flange and advantageously forms a separating wall between the two channels.

BRIEF DESCRIPTION OF THE DRAWINGS

Further advantages and details of the invention will become apparent from a consideration of the following description given with reference to the accompanying drawings in which.

DETAILED DESCRIPTION OF THE INVENTION

Figure 1:
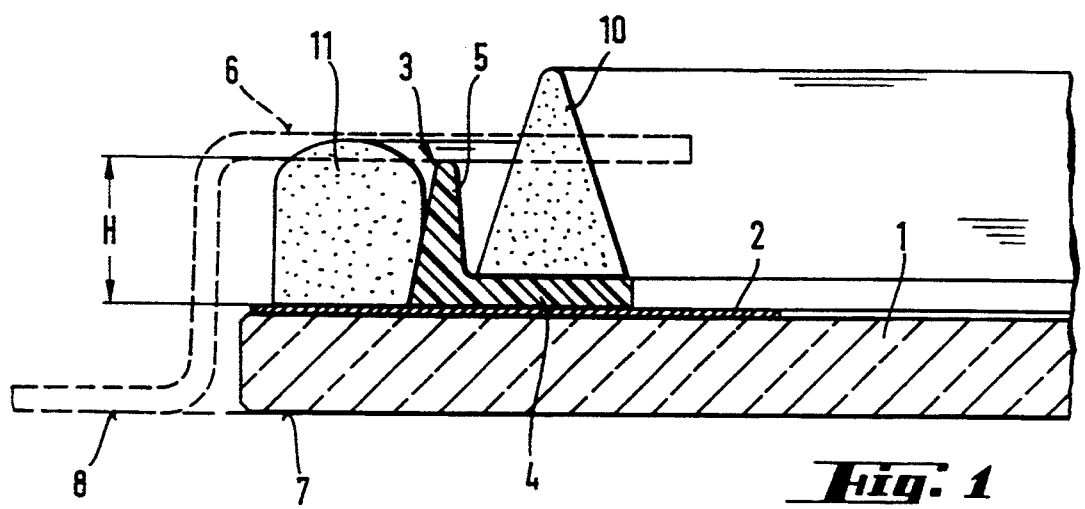
FIG. 1 shows a monolithic glass pane with a profiled spacer on one side in accordance with the invention.

Shown in FIG. 1 is a glass pane assembly in accordance with the invention for installation in a window frame. Along the border, monolithic glass pane 1 is deposited with an opaque coating 2 of, for example, an inorganic baked finish. Arranged on frame-like coating 2 and along the border of the pane is an L-shaped spacer 3 attached adhesively thereto. L-shaped spacer 3 comprises a base section 4 and a web 5 aligned approximately perpendicular to base section 4. L-shaped spacer 3 is formed by applying an extrudable polymer directly on the glass pane, such as from an extrusion die. Such extrusion apparatuses and processes are well-known in the art. For example, a suitable apparatus is described in U.S. Pat. No. 4,571,278.

An adhesion promoter, adjusted to the polymer forming the L-shaped spacer 3, may be first applied to coating 2. Typical polymer systems for the adhesion promoter layer and for L-shaped profile 3 are, for example, moisture-curing single-component polyurethane systems, such as those described in U.S. Pat. No. 3,779,794. Other two-component based polyurethane systems may similarly be used, such as are those described, for example, in EP publication 0,024,501 and in U.S. Pat. No. 4,433,010.

Web 5 of the spacer 3 has a height H, which is adjusted to the depth of the window frame such that, in the installed state of the glass pane, web 5 is supported against a fastening flange 6 of the window frame. Further, the surface 7 of glass pane 1 is flush with the outer surface 8 of the surrounding window frame, i.e., runs in the same plane.

Before the two beads of adhesive 10 and 11 are applied on both sides of web 5, the spacer 3 is allowed to harden completely. It is possible, however, to accelerate the hardening operation, if the extrusion die or glass pane is appropriately heated.

The beads of adhesive 10 and 11 are applied to the glass pane shortly before installation of the glass pane into the body of the window. Bead of adhesive 10, which in this case is applied to the side of web 5 facing the visible surface of the glass pane 1, is composed of a reaction adhesive, for example, of the same moisture-curing single-component polyurethane adhesive of which L-shaped spacer 3 is composed. This adhesive composition adheres well to the surface of hardened L-shaped spacer 3. The strand or bead of adhesive is applied with a suitable extrusion die.

Arranged on the side of web 5 facing the border of the pane is the second bead of adhesive 11. Bead of adhesive 11 is of the plastic adhesive composition and extends beyond web 5 so that when the glass pane is fitted into the window frame it is more likely to come into contact with the fastening flange 6 than with web 5. The plastic adhesive composition of bead adhesive 11 must have a high adhesion with respect to the glass pane 1 or coating 2 thereon and, moreover, with respect to fastening flange 6. Hardened web 5 of L-shaped spacer 3 which supports the bead of adhesive 11 over its entire height contributes significantly to preventing any deformation of the bead of adhesive 11 under the effect of the dead weight of the glass pane during the hardening phase of bead of adhesive 10.

Adhesives based on butyl rubber, such as those used as sealing adhesives in the production of insulating glass panes, have proved particularly useful as an adhesive composition for bead of adhesive 11.

Figure 2:
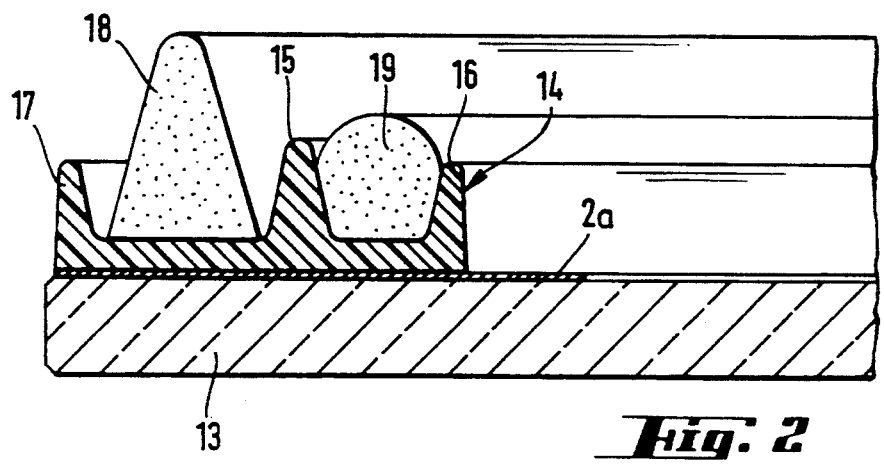
FIG. 2 shows another embodiment of a monolithic glass pane with a profiled spacer adhering on one side of the pane and having two channels.

Referring to another exemplary embodiment shown in FIG. 2, which may use the same adhesive materials as above, opaque coating 2a of a baking finish is arranged on a glass pane 13 along the border of the pane. A profiled spacer 14 is seated on coating 2a. Profiled spacer 14 is produced by directly extruding a high-viscosity, moisture-curing polyurethane pre-polymer on the glass pane 13 or on coating 2 of the glass pane. Viewing spacer 14 along its cross-section, a center web 15 is aligned perpendicular to the glass pane. Further, an inner web 16 and outer web 17 are likewise aligned approximately perpendicular to the pane. Two channel-like depressions are thus formed by the webs and the base section 12 of the spacer into which the two beads of adhesive 18 and 19 are introduced. A reaction adhesive bead 18, which permanently fastens the glass pane, is in this case arranged in the outer channel formed by webs 15 and 17 and base section 12. A bead of plastic adhesive 19 is arranged in the inner channel formed by webs 15 and 16 and base section 12. Center web 15 is slightly taller than the two other webs 16, 17 and is used to support the weight of the pane upon the fastening flange of the window frame.

Figure 3:
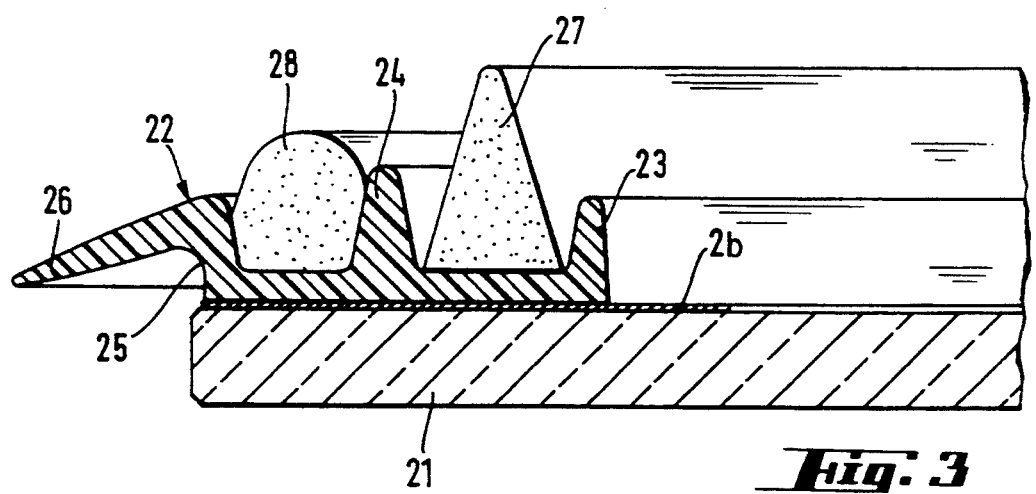
FIG. 3 shows a further embodiment of the spacer of FIG. 2 and having a lip portion oriented parallel to the pane.

FIG. 3 shows still another embodiment in which a profiled spacer 22 is deposited on a glass pane 21 or on the baked coating 2b arranged on the latter. Similarly, profiled spacer 22 may be extruded on the glass pane 21. Profiled spacer 22 has two channel-like depressions similar to the spacer 14 of FIG. 2. The inner channel-like depression is formed by an inner web 23, a center web 24 and base section 20. The outer channel-like depression is formed by center web 24, an outer web 25 and base section 20. Outer web 25 is adjoined by a lip portion 26 that extends beyond the periphery of the pane and essentially parallel thereto. Profiled spacer 22 may be composed of a cured polyurethane. A bead of reaction adhesive 27 is arranged in the inner channel between webs 23 and 24, whereas a plastic adhesive bead 28 is arranged in the outer channel between webs 24 and 25.

Figure 4:
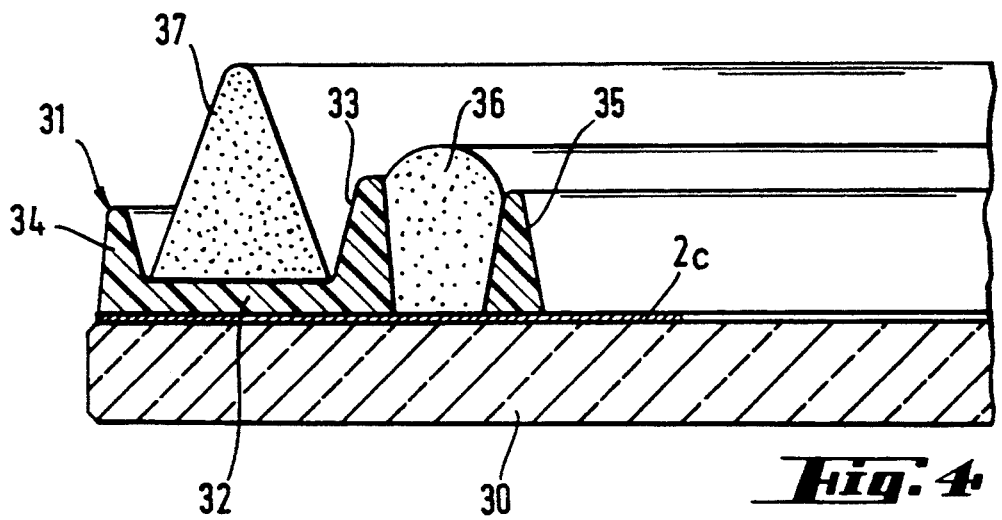
FIG. 4 shows still another embodiment of a spacer having two channels, one of which allows the adhesive to contact the pane.

FIG. 4 shows still another embodiment in which a two-part profiled spacer is arranged on a glass pane 30 or on coating 2c. The frame comprises a U-shaped spacer 31 having a base section 32 and two webs 33 and 34. The frame also comprises a single web 35 arranged at a distance from U-shaped profile 31. A plastic strand of adhesive 36 is arranged between webs 33 and 35. Adhesive 36 is in direct contact with coating 2. A bead of reaction adhesive 37 is located in the channel formed by webs 33 and 34 and base section 32.

Figure 5:
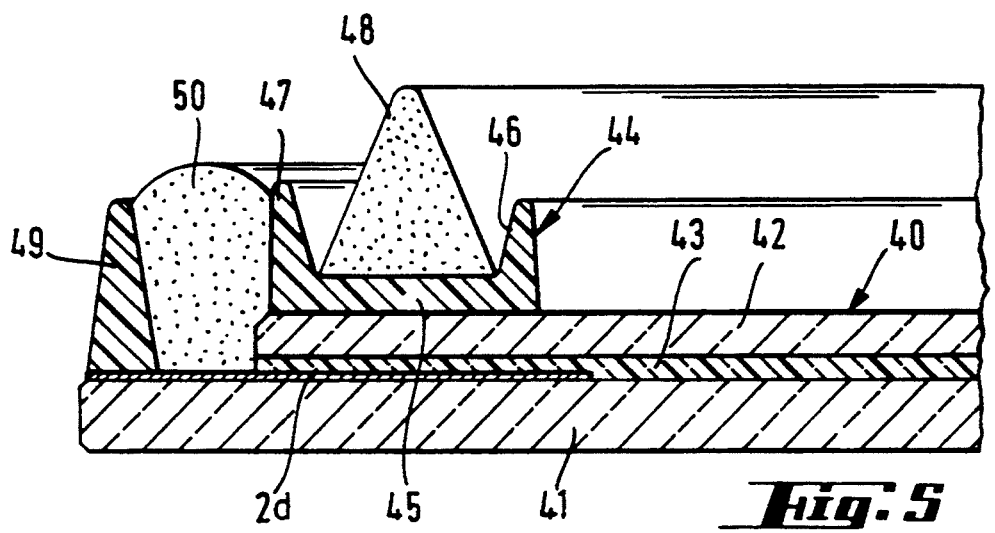
FIG. 5 shows a laminated glass pane with a profiled spacer similar to that of FIG. 4 adhered to on one side of the pane.

A further embodiment of a laminated glass pane designed according to the principles of the present invention is shown in FIG. 5. A laminated glass pane 40 comprises an outer single glass pane 41 and an inner single glass pane 42 which are bonded to each other by means of a thermoplastic intermediate layer 43. Outer glass pane 41 is wider than inner glass pane 42 so that there is a step-shaped border formation at the edge of the structure. Baked coating 2d is arranged on the side of outer glass pane 41 facing intermediate layer 43.

Arranged on the inner glass pane 42 along its border is a cross-sectional U-shaped frame profile 44 having a base section 45 and two webs 46 and 47. The production of this profile is again accomplished by an extrusion process on the glass pane, with an appropriate primer coating interposed. Spacer 44 receives the bead of reaction adhesive 48. A separate web 49 is likewise formed by extrusion and deposited on the border region of outer glass pane 41. In this way, a channel-like cavity which is filled with bead 50 of plastic adhesive composition is formed between webs 47 and 49 of spacer 44. Moreover, the channel-like cavity is formed along the peripheral surface of inner glass pane 42. As above, plastic adhesive composition 50 may be composed of butyl rubber. In addition to the function of fixing the glass pane in the installed position, adhesive composition 50 also assumes the function of sealing the thermoplastic intermediate layer 43 at the border of tile laminated glass pane.

Figure 6:
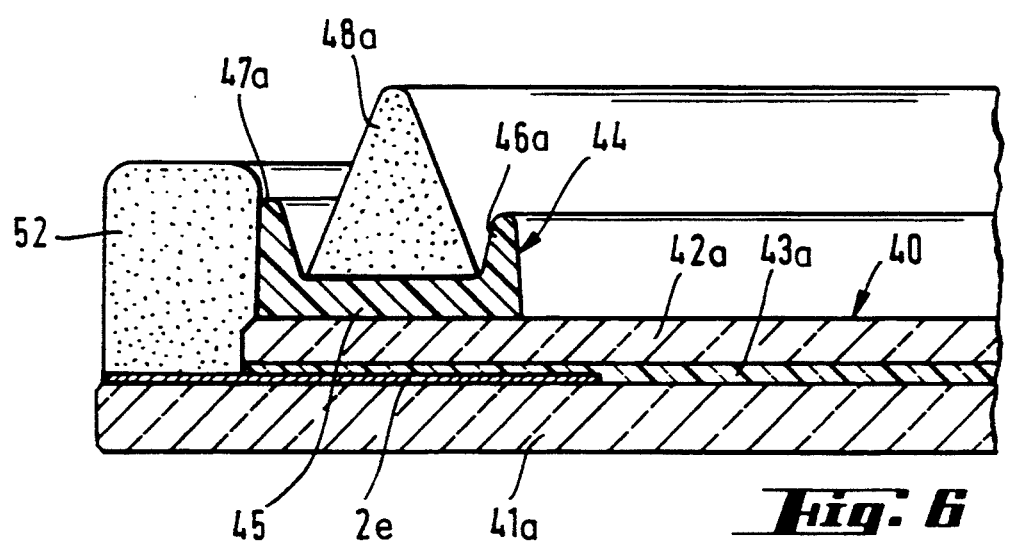
FIG. 6 shows another embodiment of a laminated glass pane with a spacer having only one channel.

Shown in FIG. 6 is a laminated glass pane 40 having a step-shaped border and comprising a wider outer pane 41a and a smaller inner pane 42a, which are bonded to each other by means of thermoplastic intermediate layer 43a. In contrast to the embodiment described with reference to FIG. 5, a larger bead of plastic adhesive composition 52 is arranged on the coating 20 of the border of outer glass pane 41 but is not delimited by outer web 49. On the inner side, however, a bead of reaction adhesive 48a directly adjoins webs 47a and 46a of spacer 44a. The adhesive composition that is exposed towards the border of the pane offers the possibility of pressing the anchoring web of a decorative profile strip into the adhesive composition after fitting of the glass pane. In this manner, it is possible to cover the gap remaining between the glass pane and the window frame by the decorative profile strip.

Figure 7:
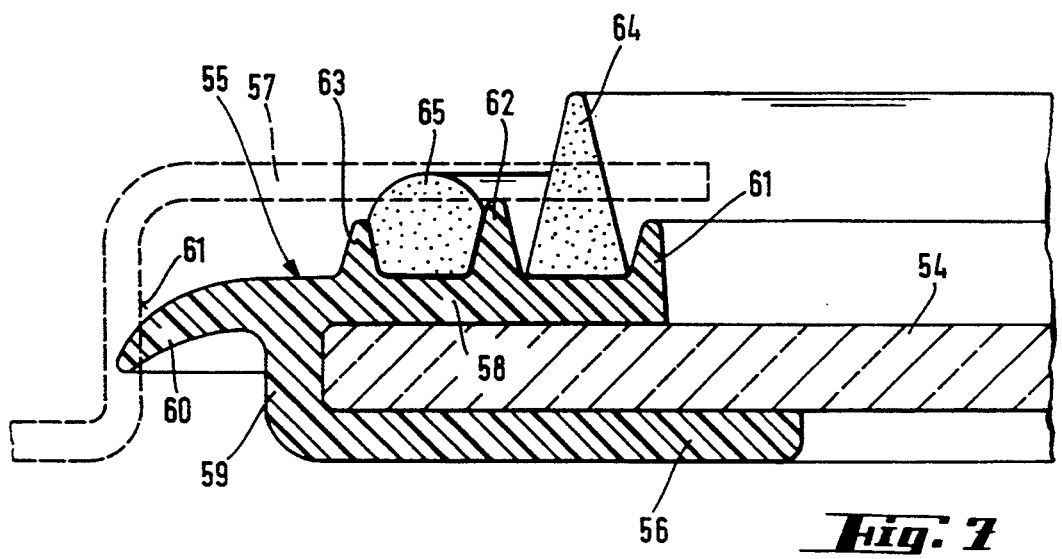
FIG. 7 shows a glass pane with a spacer which encloses the border of the pane.
Figure 8:
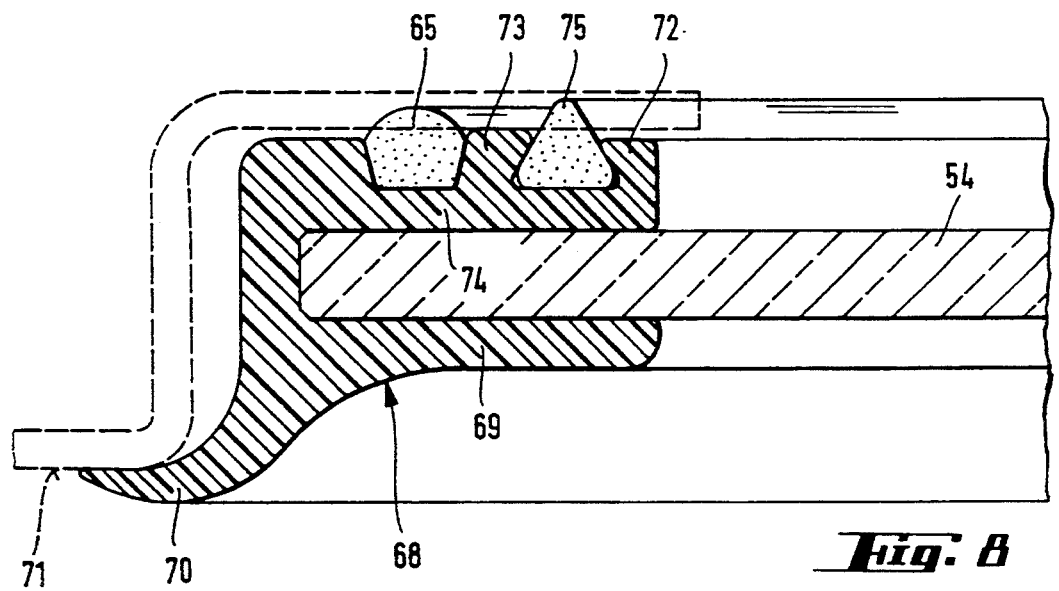
FIG. 8 shows another embodiment of a spacer which encloses the border of the glass pane.

The embodiments shown in FIGS. 7 and 8 differ from the embodiment described above in that the spacer in each case completely encloses the border of the glass pane and is molded onto a glass pane 54 by an injection-molding process.

Referring to FIG. 7, spacer 55 has a U-shaped cross-section, with an outer extension 56 arranged on the outer side of the glass pane. Spacer 55 further comprises an inner extension 58 which faces fastening flange 57. These extensions 56, 58 are joined by connection member 59. Inner extension 58 includes a lip portion 60 which, in the installed state of the glass pane, bears against wall 61 of the window frame. Arranged on inner extension 58 are three webs 61, 62, 63, which are aligned approximately perpendicular to the glass pane and form two channel-like depressions. Arranged in the inner channel-like depression (i.e., the one directed towards the visible surface of the glass pane) is a bead 64 of a reaction adhesive composition. In the outer channel-like depression is a bead 65 of a plastic adhesive composition. The adhesive compositions of beads 64 and 65 must be materials which have a good adhesion with respect to the polymer of frame 55. The surface of spacer 55 may be pre-treated with suitable adhesion promoters.

Shown in FIG. 8 is a pane encapsulating spacer 68 that differs from the previously described frame in that the outer extension 69 forms a lip portion 70 which, in the installed state of the glass pane, bears against outer surface 71 of the window frame. Furthermore, webs 72 and 73 of inner extension 74 are designed in such a way that they form a channel undercut on both sides for reaction adhesive bead 75. In this manner, the mechanical anchoring takes place between the hardened bead of adhesive 75 and a frame 68. If the surface of the channel formed by webs 72 and 73 is provided with an anti-adhesive layer or a suitable layer of release agent, the fastening of the glass pane in the window frame is essentially effected by the mechanical anchoring on account of the positive joint between reaction adhesive bead 75 and undercut webs 72, 73. In this manner, the removal of the glass pane, when necessary, can be considerably facilitated.

What is claimed is:

1. A glass pane assembly for adhesive bonding to the window frame of an automobile body, comprising:

a glass pane of predetermined weight;

a profiled spacer firmly bonded to one surface of said glass pane proximate to a peripheral edge thereof for supporting the weight of the glass pane and having at least one web aligned substantially perpendicular to said glass pane and extending towards a fastening flange oriented substantially parallel to at least one edge of the pane;

a first bead of reaction adhesive composition extending beyond said at least one web, said bead of reaction adhesive composition arranged parallel to and on a first side of said web; and a second bead of a plastic adhesive having a faster curing rate than said reaction adhesive, said plastic adhesive formed on a second side of said web to adhesively fix said glass pane relative to a fastening flange on said window frame during curing of said reaction adhesive whereby said plastic adhesive and said reaction adhesive bond said assembly to said flange of said frame without mechanical fasteners.

2. The glass pane assembly of claim 1 wherein said first side of the spacer web is directed away from the edge of said glass pane.

3. The glass pane assembly of claim 1 wherein the height of said web defines a preselected distance between said glass pane and said fastening flange when said glass pane is in an installed position.

4. The glass pane assembly of claim 1 wherein the spacer further comprises a second web aligned substantially perpendicular to said glass pane and spaced from the first web to form a first channel depression for receiving said first adhesive bead.

5. The glass pane assembly of claim 4 wherein said first channel depression is undercut to a positive joint with said first adhesive bead.

6. The glass pane assembly of claim 5 further comprising an anti-adhesive layer arranged on the surface of the first channel depression to form said positive joint with said first adhesive bead.

7. The glass pane assembly of claim 6 wherein the spacer further comprises an extension which encloses the edge of the pane.

8. The glass pane assembly of claim 7 wherein the extension further comprises a lip portion that extends beyond the outer surface of the frame.

9. The glass pane assembly of claim 4 wherein the spacer further comprises a base section connecting the first and second webs.

10. The glass pane assembly of claim 9 wherein the spacer further comprises a third web spaced from the first channel depression formed by the first and second webs and the base section to form a second channel depression.

11. The glass pane assembly of claim 10 wherein the spacer further comprises a base section connecting the third web to one of the other webs.

12. The glass pane assembly of claim 11 wherein the spacer further comprises a lip portion for contacting the fastening flange to provide a force for centering the pane on the flange.

13. The glass pane assembly of claim 12 wherein the spacer further comprises an extension which encloses the edge of the pane, 14. The glass pane assembly of claim 1 wherein the spacer further comprises second and third webs aligned substantially perpendicular to said glass pane and spaced from the first web to from first and second channel depressions for receiving said first and second adhesive beads.

15. The glass pane assembly of claim 1 wherein the second adhesive bead comprises butyl rubber.

16. The glass pane assembly of claim 1 wherein the reaction adhesive comprises a moisture-curing single-component polyurethane pre-polymer that has been cured.

17. The glass pane assembly of claim 1 wherein the first adhesive bead comprises a multi-component polyurethane.

18. The glass pane assembly of claim 1 wherein said spacer encloses the edge of the pane on a portion of both adjacent sides.

19. The glass pane assembly of claim 1 wherein the spacer further comprises a lip portion for contacting the fastening flange to provide a force for centering the pane on the flange, 20. The glass pane assembly of claim 1 wherein the spacer further comprises a base section extending along the pane to form an L-shaped profile.

21. The glass pane assembly of claim 1 further comprising a coating upon the glass pane beneath the spacer.

22. The glass pane assembly of claim 21 further comprising a layer of a thermoplastic material upon the glass pane and a second glass pane upon the thermoplastic layer 23. The glass pane assembly of claim 22 wherein the thermoplastic material and second glass pane terminate at a predetermined distance from the edge of the first glass pane to expose the coating thereupon and form a stepped structure.

24. The glass pane assembly of claim 23 wherein the second adhesive bead is placed adjacent the edge of the first glass pane on said coating.

25. The glass pane assembly of claim 1 wherein said second bead of plastic adhesive is disposed in contact with said web for bearing the weight of the glass pane during the hardening time of said reaction adhesive.

26. The glass pane assembly of claim 1 wherein the assembly includes two glass panes laminated together with one on top of the other and with the one having a peripheral edge terminating inwardly of the peripheral edge of the other; and said second bead of plastic adhesive engages against the edge of said one pane.

27. A glass pane assembly for adhesive bonding without mechanical fasteners to the window frame of an automobile body, comprising:
 a glass pane of predetermined weight:
 a fastening flange having a surface oriented in a facing position to at least one surface of the glass pane;
 a profiled spacer firmly bonded to said one surface of said glass pane proximate to a peripheral edge thereof and having at least one web aligned substantially perpendicular to said glass pane and extending towards said fastening flange, said web having an upper surface engaging with the surface of said flange for supporting the weight of the glass pane;
 a first bead of deformable reaction adhesive composition arranged along a first side of said web and engaging the surface of said flange; and
 a second bead of a deformable plastic adhesive arranged along a second side of said web and engaging the surface of said flange and adhesively holding said glass pane fixed relative to said flange during the hardening time of said reaction adhesive whereby said plastic adhesive provides bonding of said assembly to said frame without mechanical fasteners.

28. A glass pane assembly for adhesive bonding without mechanical fasteners into an installed position in the window frame of an automobile body, comprising:
 a glass pane of predetermined weight;
 a profiled spacer firmly bonded to one surface of said glass pane proximate to a peripheral edge thereof and having at least one web aligned substantially perpendicular to said glass pane, said web having an upper surface for engaging with said window frame for supporting the weight of the glass pane;
 a first bead of reaction adhesive composition arranged on a first side of said web and extending beyond the upper surface of said web; and
 a second bead of a plastic adhesive arranged on a second side of said web and extending beyond the upper surface of said web for adhering to said frame when said assembly is in said installed position to fix said assembly against movement relative to said frame during hardening of said reaction adhesive whereby said plastic adhesive provides bonding of said assembly to said frame without mechanical fasteners.

29. A glass pane assembly according to claims 27 or 28 wherein said reaction adhesive comprises a polyurethane and said plastic adhesive comprises a butyl rubber.

* * * * *